(12) United States Patent
Fidler et al.

(10) Patent No.: US 10,564,808 B2
(45) Date of Patent: Feb. 18, 2020

(54) OPTION EMPHASIZATION FOR CALL-TO-ACTION INTERFACES

(71) Applicant: Facebook, Inc., Menlo Park, CA (US)

(72) Inventors: Yaron Fidler, San Jose, CA (US); Ching-Chih Weng, Union City, CA (US); Jiayan Jiang, San Jose, CA (US)

(73) Assignee: FACEBOOK, INC., Menlo Park, CA (US)

( * ) Notice: Subject to any disclaimer, the term of this patent is extended or adjusted under 35 U.S.C. 154(b) by 211 days.

(21) Appl. No.: 15/635,005

(22) Filed: Jun. 27, 2017

(65) Prior Publication Data

US 2018/0373402 A1     Dec. 27, 2018

(51) Int. Cl.
| | |
|---|---|
| G06F 3/0482 | (2013.01) |
| G06F 3/0481 | (2013.01) |
| G06F 3/048 | (2013.01) |
| G06F 16/2457 | (2019.01) |
| G06Q 50/00 | (2012.01) |
| G06N 20/00 | (2019.01) |

(52) U.S. Cl.
CPC ........... *G06F 3/0482* (2013.01); *G06F 3/048* (2013.01); *G06F 3/0481* (2013.01); *G06N 20/00* (2019.01); *G06F 16/2457* (2019.01); *G06Q 50/01* (2013.01)

(58) Field of Classification Search
CPC ...... G06F 3/048; G06F 3/0481; G06F 3/0482; G06F 16/2457; G06Q 50/01; G06N 20/00
See application file for complete search history.

(56) References Cited

U.S. PATENT DOCUMENTS

| | | | |
|---|---|---|---|
| 2008/0201634 A1* | 8/2008 | Gibb | G06F 3/0484 715/256 |
| 2009/0271247 A1* | 10/2009 | Karelin | G06Q 10/10 705/319 |
| 2012/0223889 A1* | 9/2012 | Medlock | G06F 3/04883 345/168 |
| 2014/0173459 A1* | 6/2014 | Gaiser | H04L 67/22 715/753 |
| 2018/0181719 A1* | 6/2018 | Balian | G06Q 50/01 |

* cited by examiner

*Primary Examiner* — Ting Z Lee
(74) *Attorney, Agent, or Firm* — Kilpatrick Townsend & Stockton LLP (57) ABSTRACT

The present disclosure describes techniques for configuring a call-to-action (CTA) interface for a particular user of a social networking system (SNS) by emphasizing an option included with the CTA interface based on a machine learning system. The machine learning system may be used to determine to emphasize a first user-selectable option instead of a second user-selectable option (sometimes referred to as an emphasization determination). The emphasization determination may indicate a prediction of an intent of a user to select the first user-selectable option (e.g., an intent for the user to register an account with the SNS or to login to an account of the SNS). Based on the emphasization determination, an interface (e.g., a graphical user interface) may be configured to emphasize the first user-selectable option, and the interface may be sent to a user device for presentation to the user.

20 Claims, 8 Drawing Sheets

DETERMINE THAT AN ACCOUNT FROM A SOCIAL NETWORKING SYSTEM IS ONE OF MULTIPLE ACCOUNTS ASSOCIATED WITH A USER
510

IDENTIFY A SESSION ASSOCIATED WITH AUTHENTICATION OF THE ACCOUNT
520

DETERMINE INFORMATION ASSOCIATED WITH THE SESSION
530

OBTAIN TRAINING DATA FOR A MACHINE LEARNING SYSTEM BASED ON THE INFORMATION ASSOCIATED WITH THE SESSION
540

OPTION EMPHASIZATION FOR CALL-TO-ACTION INTERFACES

BACKGROUND

A social networking system (SNS) may enable its users to interact with and share information with each other through various interfaces provided by the SNS. The SNS may also provide various call-to-action (CTA) interfaces to users when a selection between multiple options is required. For example, a CTA interface may be provided to a user to register or login with the SNS. However, the selection between multiple options may create confusion for the user when the user does not understand the difference between the options. Therefore, there is a need in the art to provide improved interfaces when multiple options are presented.

SUMMARY

The present disclosure relates generally to option emphasization. More particularly, techniques are described for configuring a call-to-action (CTA) interface for a particular user of a social networking system (SNS) by emphasizing an option included with the CTA interface.

Various inventive embodiments are described herein, including methods, systems, non-transitory computer-readable storage media storing programs, code, or instructions executable by one or more processors, and the like. For example, a machine learning system may be used to determine to emphasize a first user-selectable option instead of a second user-selectable option (sometimes referred to as an emphasization determination). The emphasization determination may indicate a prediction of an intent of a user to select the first user-selectable option (e.g., an intent for the user to register an account with a SNS or to login to an account of the SNS). Based on the emphasization determination, an interface (e.g., a graphical user interface) may be configured to emphasize the first user-selectable option, and the interface may be sent to a user device for presentation to the user.

In some embodiments, the emphasization determination may be made in response to receiving a request from a user device to access the SNS. In such embodiments, the machine learning system (or a system using the machine learning system) may determine information associated with the user device. The information may be based on the request from the user device and/or a cookie received from the user device. For example, the information may include information stored in the cookie by the SNS or a location of the user device determined from an IP address of the user device or determined from a uniform resource locator (URL) being requested.

Examples of ways to emphasize the first user-selectable option may include modifying a color or size of the first user-selectable option or the second user-selectable option, configuring a selection focus to be associated with the first user-selectable option, modifying a layout of an interface including the first user selectable option, removing the second user-selectable option from an interface presenting the first user-selectable option, or the like.

In some embodiments, the machine learning system may be trained using past interactions with the SNS. For example, the past interactions may be based on an existing CTA interface that includes the first and second user-selectable option. In such an example, the training data may be obtained using many different approaches, some of which will be described herein.

In some embodiments, the emphasization determination described above may not involve a machine learning system. Instead, a rule or heuristic-based system may be used to determine to emphasize the first user-selectable option instead of the second user-selectable option. For example, rather than being trained from previous interactions with the SNS, the rule or heuristic-based system may be configured with a rule and/or heuristic that utilizes current information (e.g., such as a request from a user device or a cookie received from the user device) to make the emphasization determination.

According to embodiments described above, a method may be provided for sending an interface to a user device for presentation by the user device. The method may include receiving a request from the user device to access a social networking system and determining information associated with the user device. In some embodiments, the user device is not actively logged into the social networking system when the request is received. In such embodiments, the information associated with the user device may be based on a cookie received from the user device or the request from the user device. For example, the information associated with the user device may include a locale or a country associated with the user device.

Based on the information associated with the user device, the method may further include determining to emphasize a first user-selectable option instead of a second user-selectable option using a machine learning system that is trained from past interactions of users with the social networking system. The method may further include configuring an interface to send to the user device and sending the interface to the user device for presentation by the user device. Configuring the interface may include visually emphasizing the first user-selectable option.

In certain embodiments, training data for the machine learning system may include past interactions that select a user-selectable option that is visually deemphasized or past interactions that are determined to be associated with a user with multiple accounts on the social networking system. In some embodiments, the social networking system may include multiple machine learning systems, each machine learning system for different types of user-selectable options, different locations, different user devices, or the like. In such embodiments, the method may further include determining, based on the information associated with the user device, the machine learning system to use to determine which user-selectable option to emphasize.

While the method described above may be used for many different call-to-action interfaces, one illustrative example includes registering or logging into the social networking system. In such an example, the first user-selectable option may be associated with logging into the social networking system and the second user-selectable option may be associated with registering with the social networking system. In another illustrative example, the first user-selectable option may be associated with logging into the social networking system using a first account and the second user-selectable option may be associated with logging into the social networking system using a second account.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

DETAILED DESCRIPTION

The present disclosure relates generally to option emphasization. More particularly, techniques are described for configuring a call-to-action (CTA) interface for a particular user of a social networking system (SNS) by emphasizing an option included with the CTA interface.

Various inventive embodiments are described herein, including methods, systems, non-transitory computer-readable storage media storing programs, code, or instructions executable by one or more processors, and the like. For example, a machine learning system may be used to determine to emphasize a first user-selectable option instead of a second user-selectable option (sometimes referred to as an emphasization determination). The emphasization determination may indicate a prediction of an intent of a user to select the first user-selectable option (e.g., an intent for the user to register an account with a SNS or to login to an account of the SNS). Based on the emphasization determination, an interface (e.g., a graphical user interface) may be configured to emphasize the first user-selectable option, and the interface may be sent to a user device for presentation to the user.

In some embodiments, the emphasization determination may be made in response to receiving a request from a user device to access the SNS. In such embodiments, the machine learning system (or a system using the machine learning system) may determine information associated with the user device. The information may be based on the request from the user device and/or a cookie received from the user device. For example, the information may include information stored in the cookie by the SNS or a location of the user device determined from an IP address of the user device or determined from a uniform resource locator (URL) being requested.

Examples of ways to emphasize the first user-selectable option may include modifying a color or size of the first user-selectable option or the second user-selectable option, configuring a selection focus to be associated with the first user-selectable option, modifying a layout of an interface including the first user selectable option, removing the second user-selectable option from an interface presenting the first user-selectable option, or the like.

In some embodiments, the machine learning system may be trained using past interactions with the SNS. For example, the past interactions may be based on an existing CTA interface that includes the first and second user-selectable option. In such an example, the training data may be obtained using many different approaches, some of which will be described herein.

In some embodiments, the emphasization determination described above may not involve a machine learning system. Instead, a rule or heuristic-based system may be used to determine to emphasize the first user-selectable option instead of the second user-selectable option. For example, rather than being trained from previous interactions with the SNS, the rule or heuristic-based system may be configured with a rule and/or heuristic that utilizes current information (e.g., such as a request from a user device or a cookie received from the user device) to make the emphasization determination.

Figure 1:
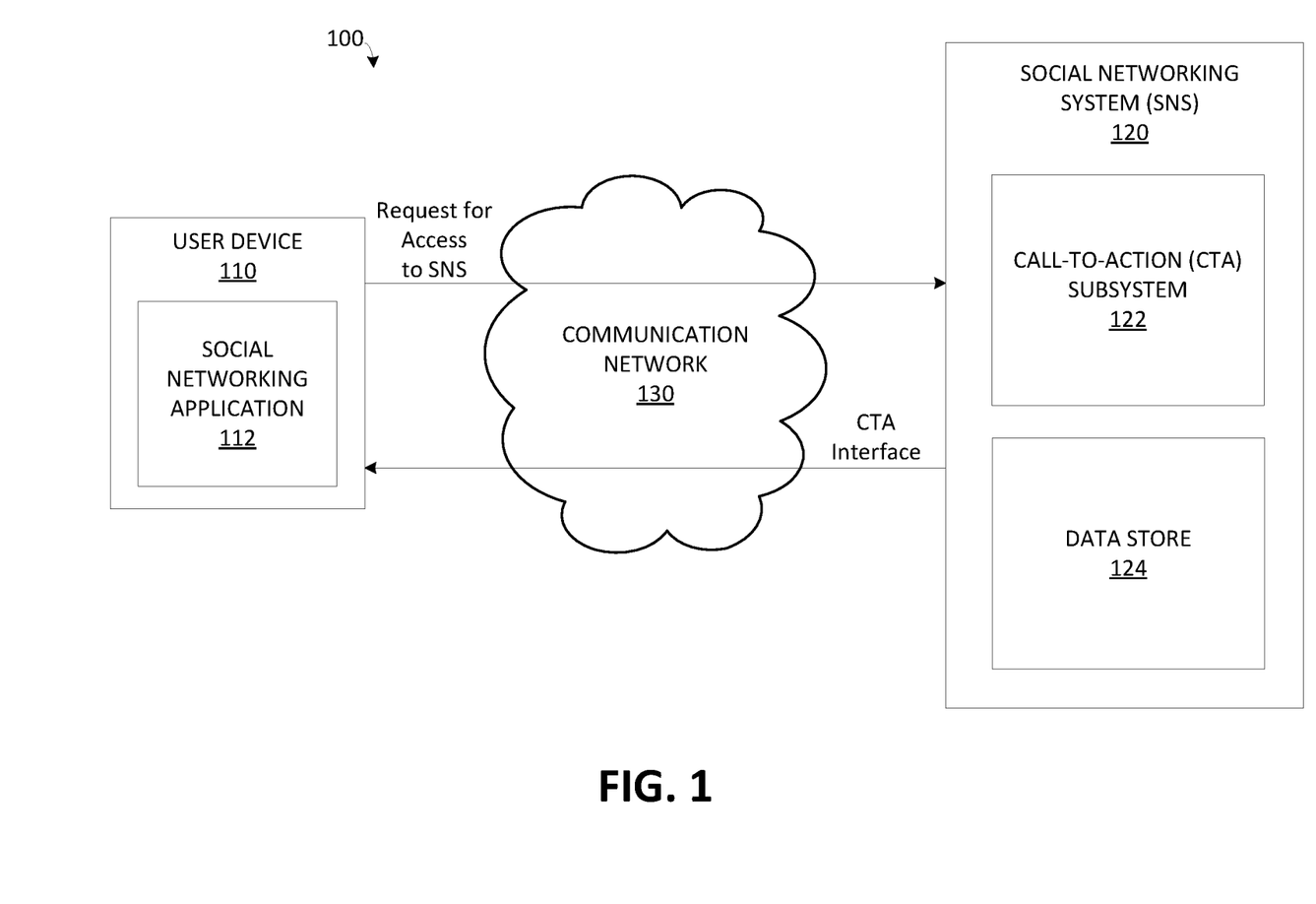
FIG. 1 is a simplified block diagram of a distributed system for performing option emphasization according to certain embodiments.

FIG. 1 is a simplified block diagram of a distributed system 100 for performing option emphasization according to certain embodiments. Distributed system 900 may include one or more systems, including social networking system (SNS) 120, communicatively coupled with one or more user devices (e.g., user device 110). In certain embodiments, the one or more user devices may be communicatively coupled with SNS 120 via one or more communication networks (e.g., communication network 130). Examples of communication networks include, without restriction, the Internet, a wide area network (WAN), a local area network (LAN), an Ethernet network, wireless wide-area networks (WWANs), wireless local area networks (WLANs), wireless personal area networks (WPANs), a public or private network, a wired network, a wireless network, and the like, and combinations thereof. Different communication protocols may be used to facilitate communications including both wired and wireless protocols such as IEEE 802.XX suite of protocols, TCP/IP, IPX, SAN, AppleTalk®, Bluetooth®, InfiniBand, RoCE, Fiber Channel, Ethernet, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), and others. A WWAN may be a network using an air interface technology, such as, a code division multiple access (CDMA) network, a Time Division Multiple Access (TDMA) network, a Frequency Division Multiple Access (FDMA) network, an OFDMA network, a Single-Carrier Frequency Division Multiple Access (SC-FDMA) network, a WiMax (IEEE 802.16), and so on. A WLAN may include an IEEE 802.11x network (e.g., a Wi-Fi network). A WPAN may be a Bluetooth network, an IEEE 802.15x, or some other types of network.

System 100 depicted in FIG. 1 is merely an example and is not intended to unduly limit the scope of inventive embodiments recited in the claims. One of ordinary skill in the art would recognize many possible variations, alternatives, and modifications. For example, in some implementations, system 100 may have more or fewer systems than those shown in FIG. 1, may combine two or more systems, or may have a different configuration or arrangement of systems.

User device 110 may sometimes be referred to as a client device, or simply a client. User device 110 may be a computing device, such as, for example, a mobile phone, a smart phone, a personal digital assistant (PDA), a tablet computer, an electronic book (e-book) reader, a gaming console, a laptop computer, a netbook computer, a desktop computer, a thin-client device, a workstation, etc.

One or more applications ("apps") may be hosted and executed by user device 110. The apps may be web browser-based applications or other types of applications. In the example embodiment depicted in FIG. 1, user device 110 hosts and executes social networking application 112, which enables a user to interact with SNS 120. For example, a user using user device 110 may log into or register with SNS 120, post content to and share content with other members of SNS 120, access and interact with content and services provided by SNS 120, and the like.

In the embodiment depicted in FIG. 1, SNS 120 includes call-to-action (CTA) subsystem 122 for configuring and sending CTA interfaces (e.g., a graphical user interface that presents multiple options to a user) to user device 110. CTA subsystem 122 may begin by determining to send a CTA interface to user device 110 in response to receiving a request for access to SNS 120. For example, user device 110 may communicate the request for access to SNS 120. SNS 120 may then send the request (or a portion thereof) to CTA subsystem 122. At the time the request is received by SNS 120, user device 110 may not be logged into an account associated with SNS 120. In one illustrative example, the request may be to access content of SNS 120. In another illustrative example, the request may be to authenticate user device 110 with SNS 120. In another illustrative example, the request may be to switch between accounts of SNS 120.

After receiving the request, CTA subsystem 122 may determine information associated with user device 110, determine which user-selectable option to emphasize in the CTA interface, and configure the CTA interface based on which user-selectable option is determined to be emphasized. Such steps allow CTA subsystem 122 to customize the CTA interface for the user. CTA subsystem 122 may then send the CTA interface to user device 110 for presentation by user device 110.

In one illustrative example described above, a CTA interface may provide multiple options regarding authentication with SNS 120 (sometimes referred to as an authentication interface). Traditionally, the authentication interface was configured the same for all users. However, embodiments described herein allow the authentication interface to emphasize particular options in order to guide users when interacting with the authentication interface.

Figure 2A:
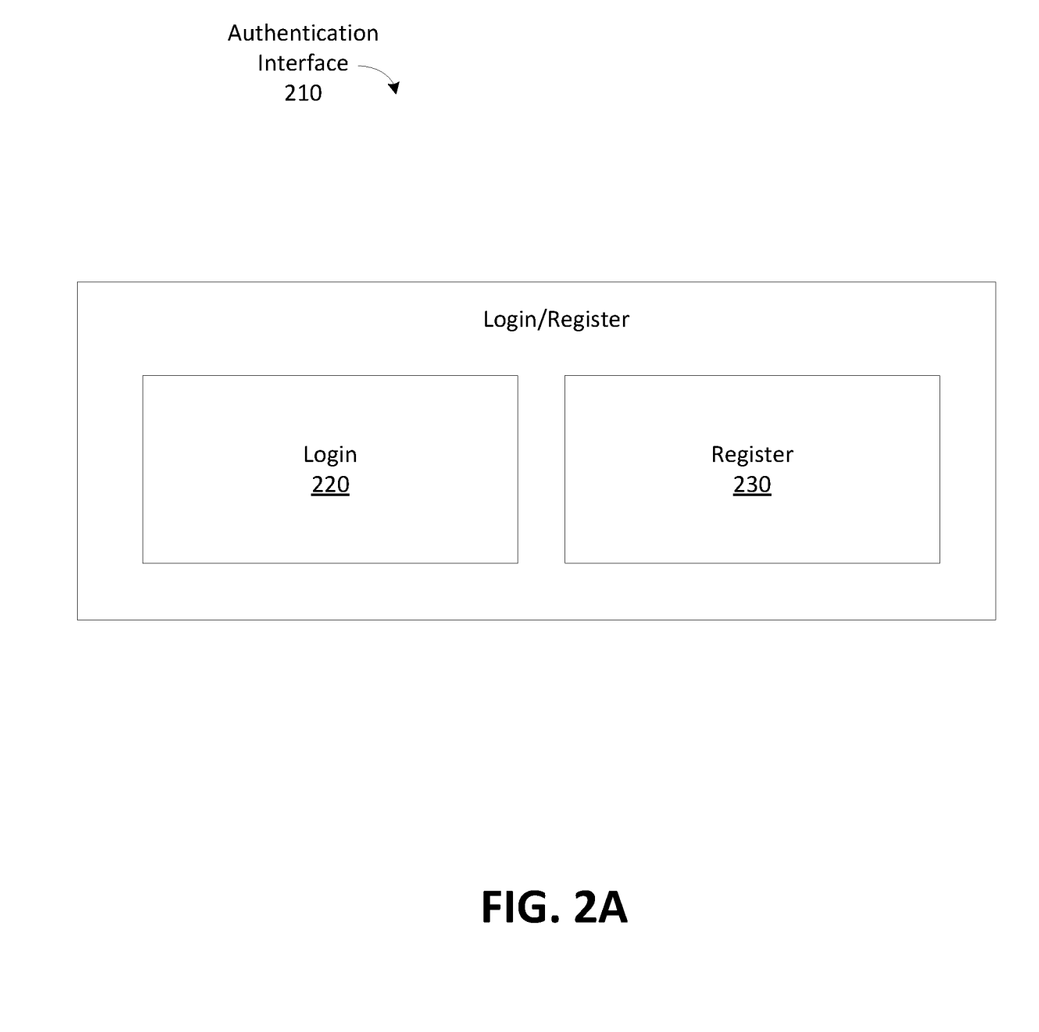
FIG. 2A depicts an example of an authentication interface according to certain embodiments.

FIG. 2A depicts an example of authentication interface 210 according to certain embodiments. Authentication interface 210 may be presented by a user device (e.g., user device 110) in response to the user device requesting to access a social networking system (SNS) (e.g., SNS 120). Authentication interface 210 may include multiple user-selectable options (e.g., a button or the like). For example, authentication interface 210 includes login option 220. Selection of login option 220 may indicate to the SNS that a user has an account with the SNS and that the user wishes to log in to the SNS using the account. In addition, selection of login option 220 may cause the user device to switch from authentication interface 210 to a login interface, allowing login information to be entered for authentication with the SNS.

Authentication interface 210 further includes register option 230. Selection of register option 230 may indicate to the SNS that a user does not have an account with the SNS and that the user wishes to register an account with the SNS. In addition, selection of register option 230 may cause the user device to switch from authentication interface 210 to a registration interface, allowing registration information to be entered for authentication with the SNS.

While FIG. 2A illustrates login option 220 and register option 230 as the same size and color, it should be recognized that each option may be a different color and/or size than the other. In addition, the layout of authentication interface 210 may be different (e.g., login option 220 may be above register option 230).

Figure 2B:
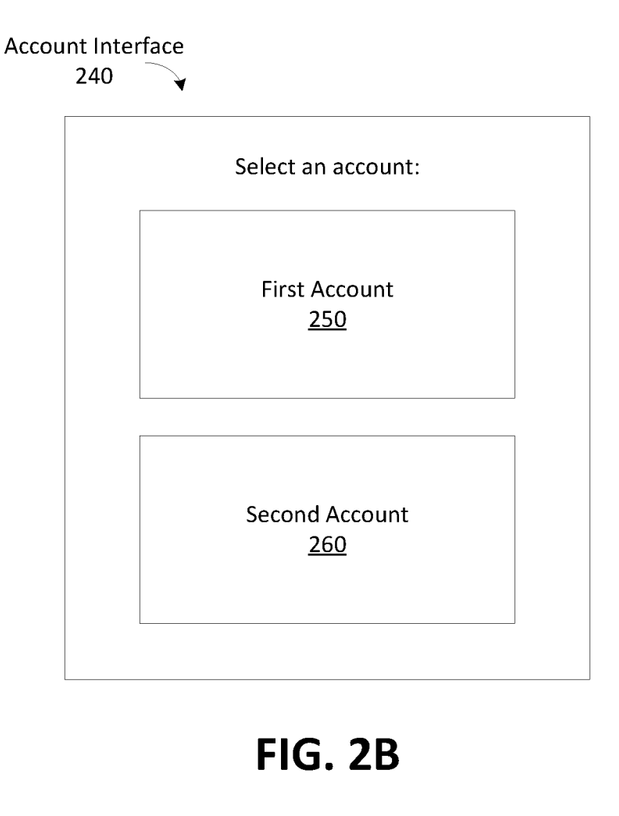
FIG. 2B depicts an example of an account interface according to certain embodiments.

Another type of interface that may be configured by CTA subsystem 122 is an account interface. FIG. 2B depicts an example of account interface 240 according to certain embodiments. Account interface 240 may be presented by a user device (e.g., user device 110) in response to the user device requesting to switch accounts associated with a social networking system (SNS) (e.g., SNS 120). Account interface 240 may include multiple user-selectable options (e.g., a button or the like) for a user to select. For example, account interface 240 includes first account option 250 and second account option 260. Selection of an account option may indicate to the SNS that a user would like to login to a corresponding account with the SNS. In addition, selection of an account option may cause the user device to switch from account interface 240 to a login interface, allowing login information to be entered for authentication of the corresponding account with the SNS.

While FIG. 2B illustrates first account option 250 and second account option 260 as the same size and color, it should be recognized that each option may be a different color and/or size than the other. In addition, the layout of account interface 240 may be different (e.g., visibility of second account option 260 may be removed).

Referring back to FIG. 1, CTA subsystem 122 may utilize a machine learning system to configure an interface specifically for a user. In particular, the machine learning system may determine a user-selectable option to emphasize in the interface based on information associated with user device 110 (i.e., the information associated with user device 110 may be input to the machine learning system). While several examples of information associated with user device 110 are described below, it should be recognized that the machine learning system may use more or less information. In addition, when some information is not available to the machine learning system for a particular session, default values may be used.

In some embodiments, the information used by the machine learning system may be based on the request. For example, the request may include an IP address associated with the request (i.e., the IP address of user device 110, a router used by user device 110, or the like). Based on the IP address, a location (e.g., a city, state, country, zip code, or the like) and/or an Internet service provider (ISP) associated with user device 110 may be determined for user device 110. The location and or the ISP may then be the information used by the machine learning system. For another example, the request may include a uniform resource locator (URL) associated with SNS 120. Based on the URL, a locale may be determined for user device 110. The locale may be included in the URL. For example, a URL may be www- .fr.website.com. Accordingly, "fr" may indicate a locale. It should be recognized that other information may be determined from the URL and/or the request.

The information used by the machine learning system may also be based on a cookie (e.g., an HTTP cookie) received from user device 110. The cookie may be data that was originally sent from SNS 120 and stored on user device 110 by a web browser of user device 110. The cookie may either be included with the request or be received in response to a separate request from SNS 120. Examples of information that may be determined from the cookie include, but is not limited to, the last account used to login to SNS 120 from user device 110, a country associated with user device 110, a locale associated with user device 110, a server protocol associated with user device 110, an operating system of user device 110, an IP address of user device 110, whether user device 110 consents to the cookie, content viewed while a previous account was logged into SNS 120, the number of accounts associated with the cookie, a model year associated with user device 110, a time since a previous login to SNS 120 from user device 110, a number of friends for the last account that logged into SNS 120 from user device 110, an age of a user associated with the last account that logged into SNS 120 from user device 110, a time since last log-out event associated with SNS 120 from user device 110, an age of the cookie, a number of logins per account of SNS 120, activity for a previous number of days for a last account that logged into SNS 120 from user device 110, a time for a last action performed by a last account that logged into SNS 120 from user device 110, or the like. While an account of SNS 120 is used in some of the examples described above, user device 110 may not be logged into the account. Instead, SNS 120 may identify the account for user device 110 without user device 110 already being logged into SNS 120. In other embodiments, information that requires an account to be identified may not be used. In other embodiments, user device 110 may be logged into the account, which would allow CTA subsystem 122 to use information stored for the account by SNS 120 in making determinations.

In some embodiments, the machine learning system used to configure the interface may be selected from multiple machine learning systems based on the information determined for user device 110. For example, a different machine learning system may be configured to be associated with one or more particular characteristics. For example, each machine learning system may be associated with a different locale, where different machine learning systems are used depending on a locale determined for a user device. Other divisions between machine learning systems may include country, user-selectable options on an interface, a type of an interface (e.g., a home page, a registration page, a login page, a profile page, a picture page, a video page, or the like), a type of server protocol, or any other type of information that is dividable between two or more categories. The machine learning system may be selected based on the information associated with the user device.

Figure 3:
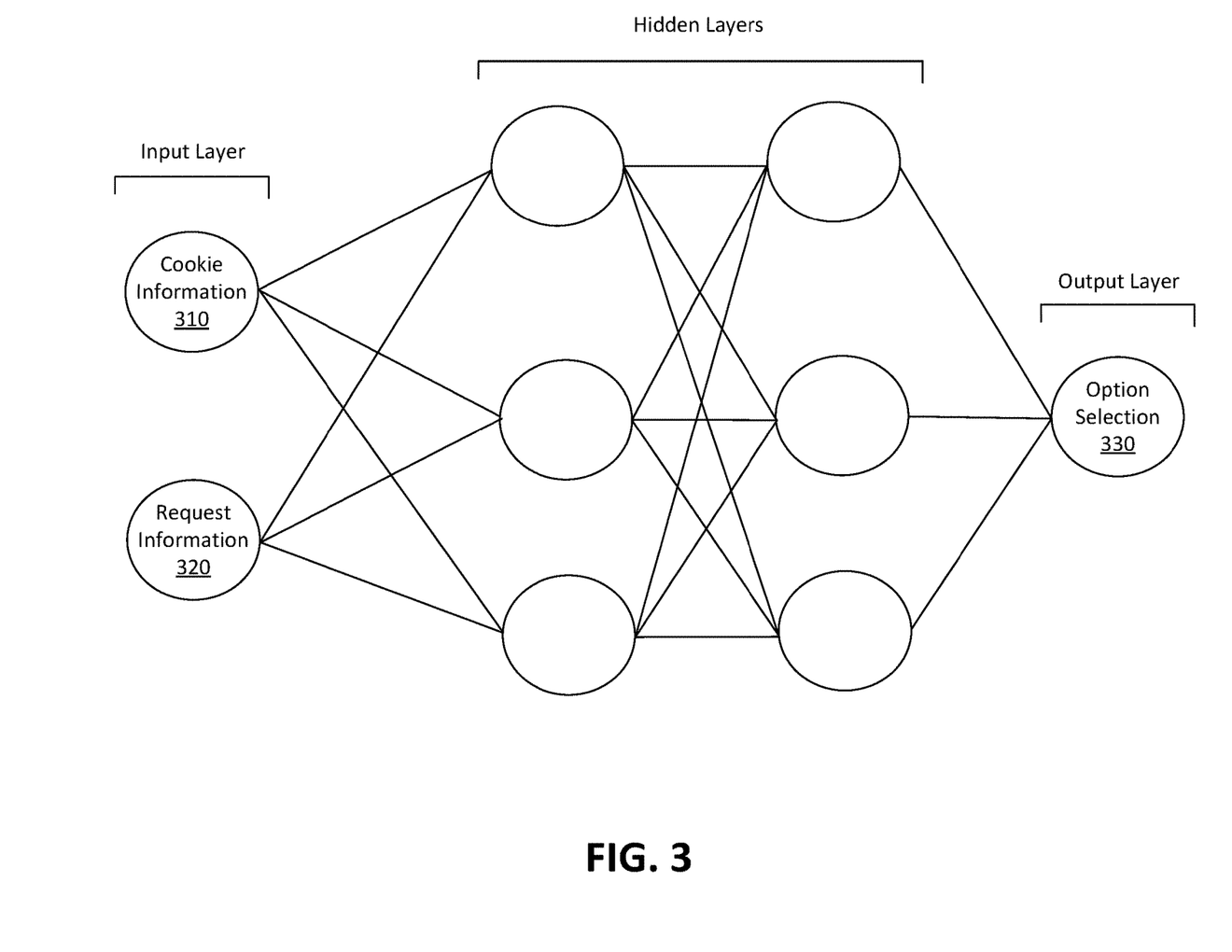
FIG. 3 depicts a graphical representation of a machine learning system according to certain embodiments.

FIG. 3 depicts a graphical representation of a machine learning system according to certain embodiments. In particular, the machine learning system depicted in FIG. 3 is a multilayer perceptron (MLP) 300. MLP 300 is a computing system made up of a number of interconnected processing elements (sometimes referred to as nodes or computing nodes). Each processing element may apply a weight, a bias, and/or an activation function to data received by the processing element. However, it should be recognized that other types of machine learning systems may be used.

MLP 300 is organized in layers (e.g., an input layer, one or more hidden layers, and an output layer), each layer including one or more nodes. Nodes that receive data from outside MLP 300 (i.e., not from nodes of MLP 300) may be called input nodes, which may be a part of the input layer. Nodes whose outputs are used externally from the MLP 300 may be called output nodes, which may be part of the output layer. Data may flow from the input layer to the output layer through one or more hidden layers (each hidden layer with one or more hidden nodes). For example, the input layer may send data to a first hidden layer and the first hidden layer may send data to either a second hidden layer or an output layer. In some examples, data may flow through the layers through connections, which may each include a weight (referred to as a weighted connection). Adjacent layers in MLP 300 may be fully connected to one another. For example, each node in a first layer may be connected to each node in a second layer when the second layer is adjacent to the first layer.

A hidden layer may include one or more hidden nodes, each of which may include an activation function (e.g., a linear or non-linear function) that is applied to a sum of the weighted inputs. Examples of activation functions may include a sigmoid function $$\left(\text{given by } \sigma(\gamma) = \frac{1}{1+e^{-\gamma}}\right),$$

an arc-tangent function $$\left(\text{given by } \sigma(\gamma) = \left(\frac{2}{\pi}\right)\right.$$

arctan($\gamma$)), a hyperbolic-tangent function $$\left(\text{given by } \sigma(\gamma) = \frac{e^{\gamma}-e^{-\gamma}}{e^{\gamma}+e^{-\gamma}}\right),$$

or a rectified linear function (given by $\sigma(\gamma)=\max(0,\gamma)$ or approximated by $\sigma(\gamma)=\ln(1+e^{\gamma})$). In some examples, a final hidden layer of the one or more hidden layers (which may be the first hidden layer or another hidden layer) may send a sum of weighted data to an output layer, which may include one or more output nodes (e.g., option selection 330).

A number of nodes in a first hidden layer may be different than a number of nodes in a second hidden layer. A number of nodes in a hidden layer may also be different than a number of nodes in the input layer.

A final hidden layer of the one or more hidden layers may be fully connected to the output layer. In such examples, the final hidden layer may be the first hidden layer or another hidden layer. The output layer may include one or more output nodes (e.g., option selection 330). An output node may sum data provided to the output node to produce a result to provide to a system remote from MLP 300. Option selection 330 may indicate which user-selectable option to emphasize. It should be recognized that the one or more output nodes may be something other than an indication of which user-selectable option to emphasize. For example, the one or more output nodes may indicate a determined intent of a user, the determined intent being used to determine which user-selectable option to emphasize.

MLP 300 may include some form of learning rule, which modifies one or more weights associated with connections between nodes according to data that is presented to MLP 300. Although there are many different kinds of learning rules used by MLPs, one example is backpropagation. With backpropagation, learning may be a supervised process that occurs each time MLP 300 is presented with new data through a forward flow of MLP 300 (commonly referred to as feed forward). Once an output is generated, an error may be calculated based on the output and a ground truth. The ground truth may represent what the output should have been if MLP 300 was configured correctly. The weights are then updated starting from the output layer and flowing to the input layer to minimize the error. This process may iterate through the same input and/or multiple different inputs until the error is within a threshold (e.g., less than a specific value or changed by less than a specific value across one or more iterations). After weights have been trained, MLP 300 may be used on new data that MLP 300 was not trained on.

As described above, the input layer may include one or more input nodes. The one or more input nodes may each receive data from one or more sources that are remote from MLP 300. For example, one or more nodes of the input layer may include information determined from a cookie (e.g., an HTTP cookie) that is received from a user device (e.g., cookie information 310). As described above, the cookie may be data sent from a social networking system (SNS) (e.g., SNS 120) and stored on the user device by a web browser of the user device.

One or more nodes of the input layer may also include information determined from the request received by the SNS (e.g., request information 320). For example, the request may include an IP address associated with the user device, which may be used to determine a country associated with the user device. For another example, the request may indicate to the SNS a URL associated with the SNS. The URL may be used to determine a locale associated with the user device when the URL includes locale information (e.g., a URL may change its domain depending on a location of the user device such as fr.website.com and au.website.com).

MLP 300 may be trained using training data. The training data may include an input (e.g., the data received by the input layer described above, which may be associated with a session) and an expected output (sometimes referred to as a ground truth) (e.g., a result of the session such as whether the first user-selectable or the second user-selectable option was selected or whether the account is indicated as being associated with a single user that has multiple accounts). While the training data may be obtained in a number of ways, two approaches will be described below, including an online interaction approach and a single user multiple accounts (SUMA) approach.

Figure 4:
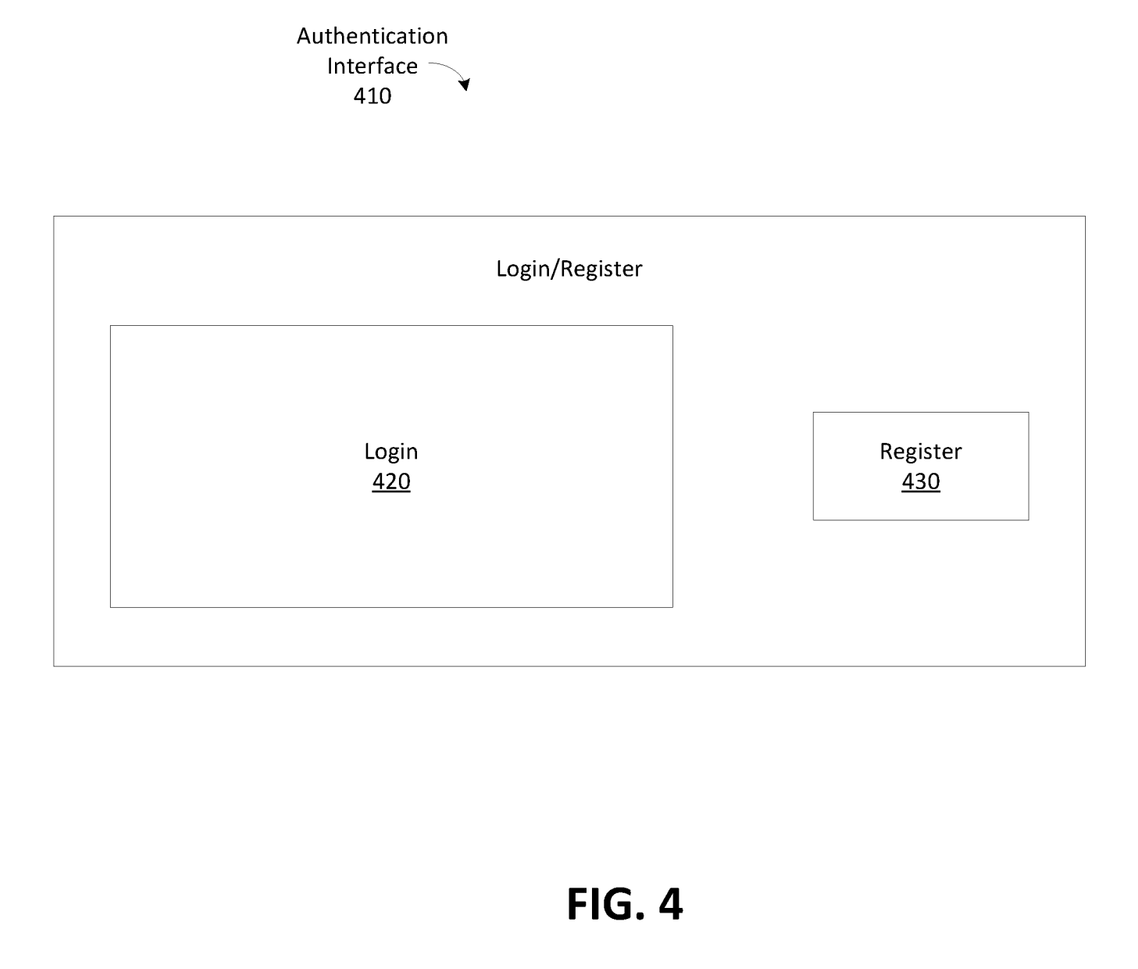
FIG. 4 depicts an example of an authentication interface with a login option emphasized according to certain embodiments.

The online interaction approach may configure an existing CTA interface to emphasize a first user-selectable option instead of a second user-selectable option (as illustrated in FIG. 4). In particular, FIG. 4 depicts an example of authentication interface 410 with login option 420 emphasized according to certain embodiments. Login option 420 is depicted as larger than register option 430, thereby emphasizing login option 420 instead of register option 430. However, it should be recognized that an option may be emphasized in other ways, including with the use of color, the layout of authentication interface 410, and/or by configuring a selection focus to be associated with the option.

Referring back to the online interaction approach, when the second user-selectable option is selected (instead of the first user-selectable option even though the first user-selectable option is emphasized), a session associated with the selection may be stored as training data. The online interaction approach is based on the fact that if a user-selectable option that is not being emphasized is selected instead of a user-selectable option that is being emphasized, it is clear that the intent of the user was to select the user-selectable option that is not being emphasized. On the other hand, when a user-selectable option that is being emphasized is selected, it is not clear what the intent of the user was. For example, the user may have just picked the user-selectable option that is emphasized because it is more prominent.

The SUMA approach may use a SUMA identification of an account to determine to use sessions associated with registering and/or logging into the account. For example, a social networking system (SNS) may include a system for identifying whether a single user is associated with multiple accounts. Each of the accounts identified by the system may be determined to be SUMAs. In one illustrative example, multiple accounts may be identified to be associated with a single user when each of the accounts is from a single IP address, and each account has less than a predefined number of friends. However, a person of ordinary skill in the art will recognize many ways for determining whether an account is a SUMA, including methods utilizing machine learning systems.

Figure 5:
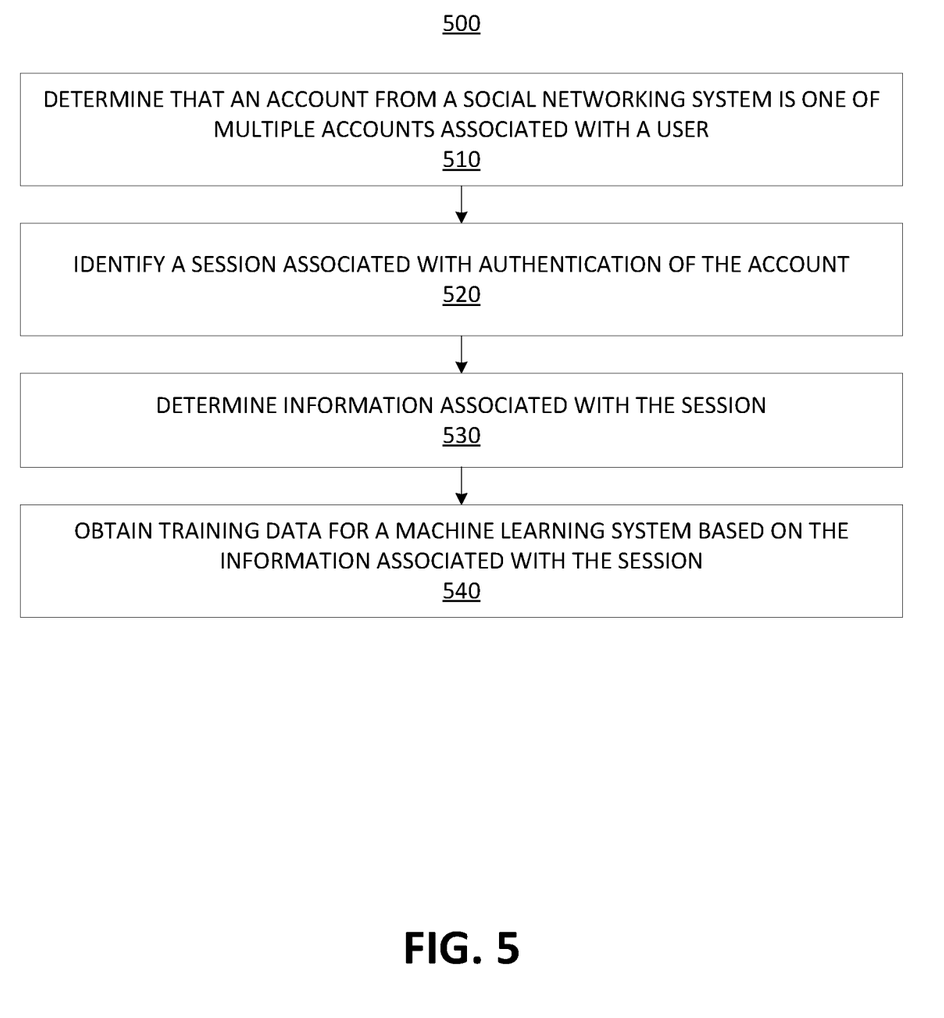
FIG. 5 is a simplified flowchart depicting processing performed for generating training data for a single user multiple account (SUMA) approach according to certain embodiments.

FIG. 5 is a simplified flowchart depicting processing performed for generating training data for a single user multiple account (SUMA) approach according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain embodiments, the steps may be performed in some different order or some steps may also be performed in parallel. In the embodiment depicted in FIG. 1, the processing depicted in FIG. 5 may be performed by CTA subsystem 122, however, this is not intended to be limiting.

In the embodiment depicted in FIG. 5, the processing may be triggered at 510, when an account from a social networking system (SNS) is determined to be one of multiple accounts associated with a user. As described above, there is a multitude of ways that the account may be determined, including using machine learning systems.

At 520, a session from the past that is associated with authentication of (e.g., registering or logging into) the account may be identified. The session may include an interaction with an authentication interface when choosing between whether to log in or register.

At 530, information associated with the session is determined. The information may be determined based on a request for the authentication interface, a cookie received from a user device, or any other information obtainable by CTA subsystem 122. While other examples are described herein, particular examples of the information may include a locale or country associated with the user device and data stored in the cookie (by a SNS associated with the CTA subsystem 122) regarding past interactions with the SNS by the user device.

At 540, training data is obtained for a machine learning system based on the information associated with the session (sometimes referred to as session information). Obtaining the training data may include associating the session information with an indication that the session resulted in an account that is a SUMA. Accordingly, the machine learning system may determine when a login or registration is likely to be a SUMA after being trained using the training data described above.

Figure 6:
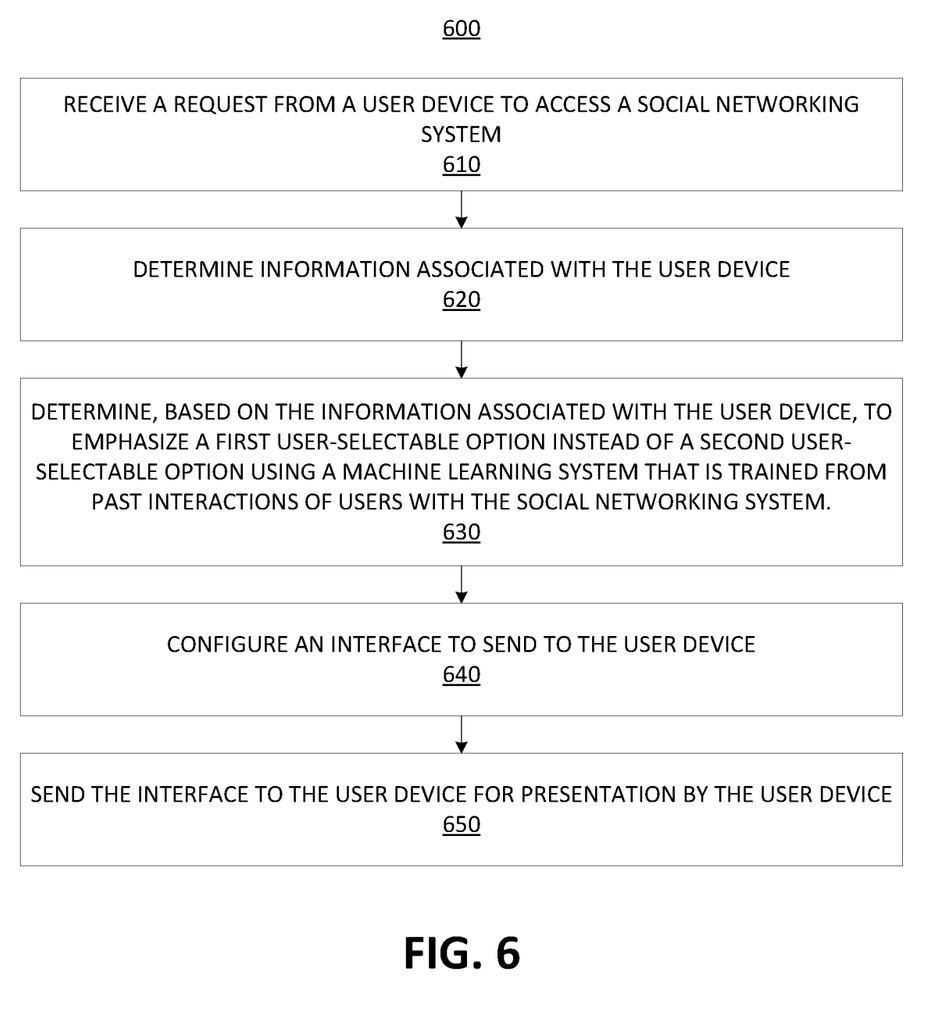
FIG. 6 is a simplified flowchart depicting processing performed for performing option emphasization according to certain embodiments.

FIG. 6 is a simplified flowchart depicting processing performed for performing option emphasization according to certain embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain embodiments, the steps may be performed in some different order or some steps may also be performed in parallel. In the embodiment depicted in FIG. 1, the processing depicted in FIG. 6 may be performed by CTA subsystem 122, however, this is not intended to be limiting.

In the embodiment depicted in FIG. 6, the processing may be triggered at 610, when a request is received from a user device to access a social networking system (SNS). For example, the request may be for particular content of the SNS. For another example, the request may be to authenticate the user device with the SNS. In either example, the user device may not be actively logged into the SNS. Accordingly, information associated with an account of the SNS may be unavailable because the account is not identified. However, in other embodiments, an account associated with the SNS may be identified for a user such that data stored by the SNS for the account may be used for determining which option to emphasize. While the description below may relate to an authentication interface (e.g., register and/or login an account), it should be recognized that the disclosure herein may be related to determining between any two options, such as between logging into the SNS using a first account or a second account.

At 620, information associated with the user device is determined. The information may be determined from a cookie received from the user device. For example, the request may include the cookie. For another example, in response to the request to access, the SNS may send a request for a cookie to the user device. The request for the cookie may cause the user device to send a cookie to the SNS. The information associated with the user device may also be determined from an internet protocol (IP) address included in the request to access. For example, using the IP address, a country associated with the user device may be determined, the country being information associated with the user device. The information associated with the user device may also be determined from a universal resource locator (URL) requested by the user device. For example, using the URL, a locale associated with the user device may be determined when the URL is formed based on a locale that the user device is located.

At 630, a machine learning system may determine to emphasize a first user-selectable option instead of a second user-selectable option based on the information associated with the user device. The machine learning system may be trained from past interactions of users with the SNS. For example, the training data for the machine learning system may include sessions where an option was selected that was not emphasized when there was a different option that was emphasized. For another example, the training data may include sessions that have been determined to be associated with a single user with multiple accounts (sometimes referred to as SUMA), indicating that a user should not have been given an option to register an account.

In some embodiments, the machine learning system may be selected from multiple machine learning systems, each machine learning system associated with a particular characteristic. For example, each machine learning system may be associated with a different locale, where different machine learning systems are used depending on a local determined for a user device. Other divisions between machine learning systems may include country, user-selectable options on a page, the particular type of page, or any other type of information that is dividable between two or more categories. The machine learning system may be selected based on the information associated with the user device.

At 640, an interface (e.g., a graphical user interface with at least the first user-selectable option) is configured to send to the user device. The interface may be configured to emphasize the first user-selectable option based on the determination by the machine learning system. For example, the first user-selectable option may be made a color or size that emphasizes the first user-selectable option instead of a second user-selectable option. For another example, the layout of the page may emphasize the first user-selectable option. For another example, a selection focus may be associated with the first user-selectable option when the page is presented by the user device. In some embodiments, the second user-selectable option may be removed from the interface. In other embodiments, emphasizing the first user-selectable option may be performed by deemphasizing the second user-selectable option. Deemphasizing the second user-selectable option may be performed by doing the opposite of one or more of the examples described above. For example, the second user-selectable option may be made a color or size that deemphasizes the second user-selectable option. At 650, the interface is sent to the user device for presentation by the user device.

Figure 7:
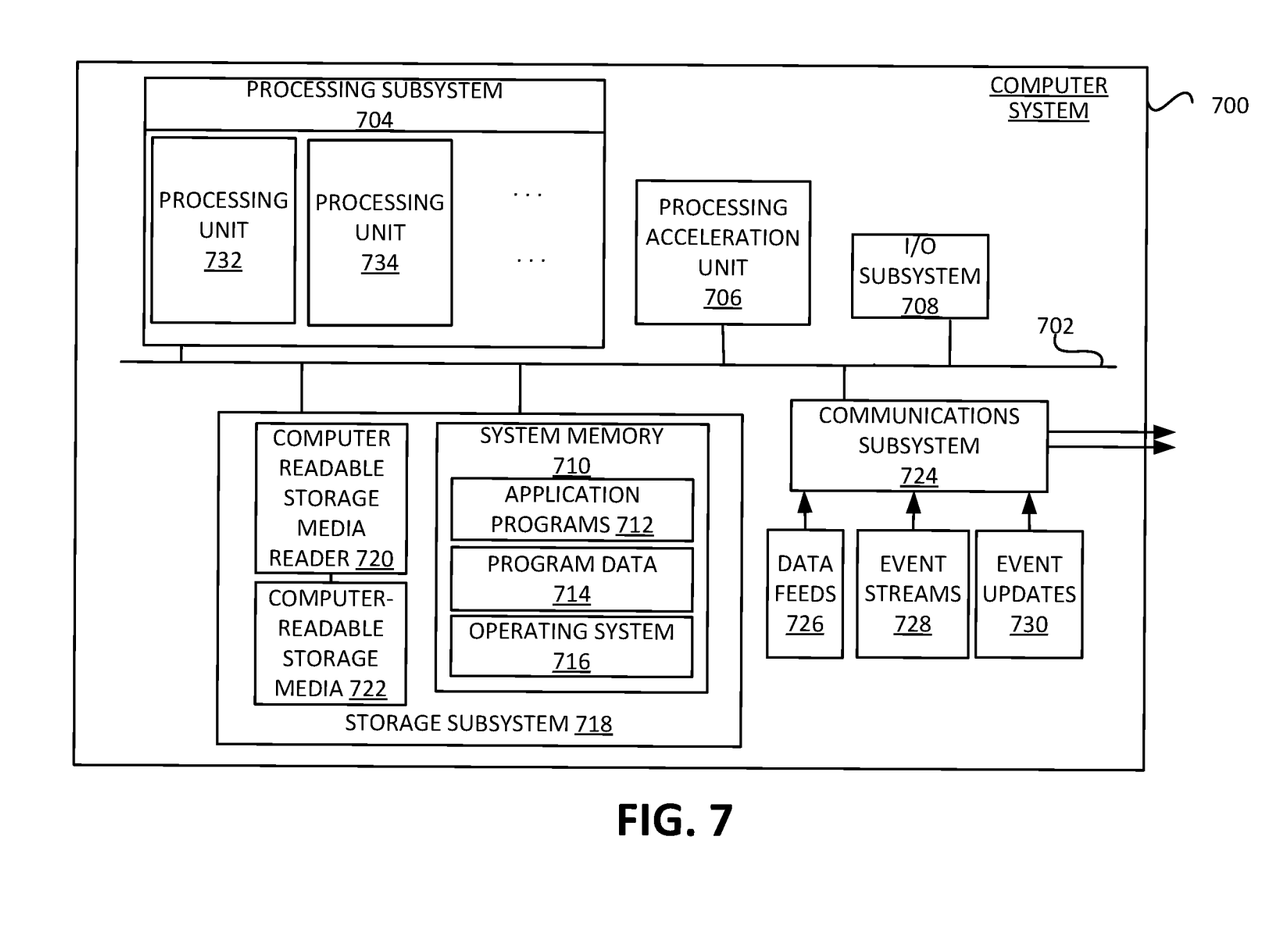
FIG. 7 illustrates an example of a computer system that may be used to implement certain embodiments described herein.

FIG. 7 illustrates an example of computer system 700, which may be used to implement certain embodiments described herein. For example, in some embodiments, computer system 700 may be used to implement any of the systems, servers, devices, or the like described above. As shown in FIG. 7, computer system 700 includes various subsystems including processing subsystem 704 that communicates with a number of other subsystems via bus subsystem 702. These other subsystems may include processing acceleration unit 706, I/O subsystem 708, storage subsystem 718, and communications subsystem 1024. Storage subsystem 718 may include non-transitory computer-readable storage media including storage media 722 and system memory 710.

Bus subsystem 702 provides a mechanism for letting the various components and subsystems of computer system 700 communicate with each other as intended. Although bus subsystem 702 is shown schematically as a single bus, alternative embodiments of bus subsystem 702 may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include single core and/or multicore processors. The processing resources of computer system 700 may be organized into one or more processing units 732, 734, etc. A processing unit may include one or more processors, one or more cores from the same or different processors, a combination of cores and processors, or other combinations of cores and processors. In some embodiments, processing subsystem 704 may include one or more special purpose co-processors such as graphics processors, digital signal processors (DSPs), or the like. In some embodiments, some or all of the processing units of processing subsystem 704 may be implemented using customized circuits, such as application specific integrated circuits (ASICs), or field programmable gate arrays (FPGAs).

In some embodiments, the processing units in processing subsystem 704 may execute instructions stored in system memory 710 or on computer readable storage media 722. In various embodiments, the processing units may execute a variety of programs or code instructions and may maintain multiple concurrently executing programs or processes. At any given time, some or all of the program code to be executed may be resident in system memory 710 and/or on computer-readable storage media 722 including potentially on one or more storage devices. Through suitable programming, processing subsystem 704 may provide various functionalities described above. In instances where computer system 700 is executing one or more virtual machines, one or more processing units may be allocated to each virtual machine.

In certain embodiments, processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices that enable users to control and interact with an input device and/or devices that provide an interface for receiving input using gestures and spoken commands. User interface input devices may also include eye gesture recognition devices that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer system. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes system memory 710 and computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and operating system 716.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include computer-readable storage media reader 720 that may further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, when computer system 700 is used to implement social networking system 120 depicted in FIG. 1, communication subsystem 724 may be used to communicate with user device 110.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments, communications subsystem 724 may provide wired network connectivity (e.g., Ethernet) in addition to or instead of a wireless interface.

Communication subsystem 724 may receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 1024 may be configured to receive (or send) data feeds 726 in real-time from users of social media networks and/or other communication services such as web feeds and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 may be one of various types, including a handheld portable device, a wearable device, a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Some embodiments described herein make use of social networking data that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well.

In the preceding description, for the purposes of explanation, specific details are set forth in order to provide a thorough understanding of examples of the disclosure. However, it should be apparent that various examples may be practiced without these specific details. For example, circuits, systems, networks, processes, and other components may be shown as components in block diagram form in order to not obscure the examples in unnecessary detail.

In other instances, well-known circuits, processes, algorithms, structures, and techniques may have been shown without necessary detail in order to avoid obscuring the examples. The figures and description are not intended to be restrictive.

The description provides examples only, and is not intended to limit the scope, applicability, or configuration of the disclosure. Rather, the description of the examples provides those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some embodiments, the systems may be configured as a distributed system where one or more components of the system are distributed across one or more networks such as in a cloud computing system.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented as a computer program product containing computer program code or instructions executable by one or more processors for performing any or all of the steps, operations, or processes described in this disclosure, where the computer program may be stored on a non-transitory computer readable medium. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
  receiving a request from a user device to access a system;
  determining information associated with the user device;
  determining whether the user device is associated with multiple accounts in the system;
  providing the information associated with the user device and the determination that the user device is associated with multiple accounts in the system as inputs to a machine learning system to output an indication of emphasizing a first user-selectable option associated with logging into an existing account with respect to a second user-selectable option associated with registering a new account, the machine learning system being trained from past interactions of users with the system;
  configuring, based on the indication, an interface to send to the user device, wherein configuring the interface includes visually emphasizing the first user-selectable option; and
  sending the interface to the user device for presentation by the user device.

2. The method of claim 1, wherein the user device is not actively logged into the system.

3. The method of claim 1, wherein the information associated with the user device is based on a cookie received from the user device.

4. The method of claim 1, wherein the information associated with the user device includes a locale or a country associated with the user device.

5. The method of claim 1, further comprising:
  determining, based on the information associated with the user device, the machine learning system from multiple machine learning systems.

6. The method of claim 1, wherein visually emphasizing the first user-selectable option includes changing:
  a color or a size of the first user-selectable option or the second user-selectable option;
  a layout of the interface; and
  a selection focus to the first user-selectable option.

7. The method of claim 1, wherein the first user-selectable option is associated with logging into the system using a first account, and wherein the second user-selectable option is associated with logging into the system using a second account.

8. The method of claim 1, wherein training data for the machine learning system includes past interactions that select a user-selectable option that is visually deemphasized.

9. The method of claim 1, wherein the training data for the machine learning system includes past interactions that are determined to be associated with a user with multiple account on the system.

10. The method of claim 1, wherein the machine learning system is trained based on the past interactions of a subset of the users having multiple accounts at the system to output, based on the inputs indicating that the user device is also associated with multiple accounts at the system, the indication emphasizing the first user-selectable option associated with logging into an existing account with respect to the second user-selectable option associated with registering a new account.

11. The method of claim 1, wherein the machine learning system is trained to output, based on the inputs indicating that the user device is associated with multiple accounts at the system, the indication emphasizing the first user-selectable option associated with logging into a first account at the system with respect to the second user-selectable option associated with logging into a second account at the system.

12. The method of claim 1, wherein the machine learning system is trained to output, based on the inputs indicating that the user device is associated with multiple accounts at the system, the indication emphasizing the first user-selectable option associated with a first way of accessing the system with respect to the second user-selectable option associated with a second way of accessing the system.

13. A non-transitory computer-readable storage medium storing a plurality of instructions executable by one or more processors, the plurality of instructions when executed by the one or more processors cause the one or more processors to:
  receive a request from a user device to access a system;
  determine information associated with the user device;
  determining whether the user device is associated with multiple accounts in the system;
  provide the information associated with the user device and the determination that the user device is associated with multiple accounts in the system as inputs to a machine learning system to output an indication of emphasizing a first user-selectable option associated with logging into an existing account with respect to a second user-selectable option associated with registering a new account, the machine learning system being trained from past interactions of users with the system;

configure, based on the indication, an interface to send to the user device, wherein configuring the interface includes visually emphasizing the first user-selectable option; and sending the interface to the user device for presentation by the user device.

14. The non-transitory computer-readable storage medium of claim 13, wherein the user device is not actively logged into the system.

15. The non-transitory computer-readable storage medium of claim 13, wherein the information associated with the user device is based on a cookie received from the user device.

16. The non-transitory computer-readable storage medium of claim 13, wherein the information associated with the user device includes a locale or a country associated with the user device.

17. The non-transitory computer-readable storage medium of claim 13, wherein visually emphasizing the first user-selectable option includes changing:
- a color or a size of the first user-selectable option or the second user-selectable option;
- a layout of the interface; and
- a selection focus to the first user-selectable option.

18. The non-transitory computer-readable storage medium of claim 13, wherein training data for the machine learning system includes:
- past interactions that select a user-selectable option that is visually deemphasized; or
- past interactions that determined to be associated with a user with multiple account on the system.

19. A method comprising:

receiving a request from a user device to access a system;

determining information associated with the user device, wherein the information associated with the user device is based on the request from the user device or a cookie received from the user device;

determining whether the user device is associated with multiple accounts in the system;

providing the information associated with the user device and the determination that the user device is associated with multiple accounts in the system as inputs to a machine learning system to output an indication to emphasize a first user-selectable option associated with logging into an existing account with respect to a second user-selectable option associated with registering a new account, the machine learning system being trained from past interactions of users with the system;

configuring an interface to send to the user device, wherein configuring the interface includes visually emphasizing the first user-selectable option; and sending the interface to the user device for presentation by the user device.

20. The method of claim 19, wherein the user device is not actively logged into the system.

* * * * *